(12) United States Patent  
Nakamura

(10) Patent No.: US 8,310,960 B2
(45) Date of Patent: Nov. 13, 2012

(54) COMMUNICATION APPARATUS, METHOD FOR CONTROLLING COMMUNICATION APPARATUS, COMMUNICATION SYSTEM, PROGRAM AND MEDIUM

(75) Inventor: Soichi Nakamura, Yokohama (JP)

(73) Assignee: Ricoh Technology Research, Inc., Yokohama-shi (JP)

( * ) Notice: Subject to any disclaimer, the term of this patent is extended or adjusted under 35 U.S.C. 154(b) by 1047 days.

(21) Appl. No.: 11/331,225

(22) Filed: Jan. 13, 2006

(65) Prior Publication Data

US 2006/0209708 A1  Sep. 21, 2006

(30) Foreign Application Priority Data

Mar. 18, 2005 (JP) ................................. 2005-080209
Oct. 11, 2005 (JP) ................................. 2005-296527

(51) Int. Cl.
  *H04L 5/14* (2006.01)
  *H04B 1/44* (2006.01)
  *G06F 15/16* (2006.01)
(52) U.S. Cl. ......... 370/276; 370/282; 709/227; 709/237
(58) Field of Classification Search ................ 370/282
See application file for complete search history.

(56) References Cited

U.S. PATENT DOCUMENTS

| 5,978,849 | A * | 11/1999 | Khanna ............... 709/227 |
| 6,857,009 | B1 * | 2/2005 | Ferreria et al. ........... 709/219 |
| 7,127,524 | B1 * | 10/2006 | Renda et al. ............ 709/245 |
| 7,269,388 | B2 * | 9/2007 | Poursabahian et al. ...... 455/41.2 |
| 7,278,021 | B2 * | 10/2007 | Shigeeda ............... 713/182 |
| 7,318,234 | B1 * | 1/2008 | Dharmarajan ............ 726/2 |
| 7,334,257 | B1 * | 2/2008 | Ebrahimi et al. ......... 726/3 |
| 7,349,360 | B2 * | 3/2008 | Gutierrez et al. ......... 370/315 |
| 7,665,130 | B2 * | 2/2010 | Johnston et al. .......... 726/12 |
| 7,797,744 | B2 * | 9/2010 | Hall .................... 726/23 |
| 2003/0079033 | A1 * | 4/2003 | Craft et al. ............ 709/230 |
| 2003/0236086 | A1 * | 12/2003 | Litwin, Jr. ............. 455/412.1 |
| 2004/0078480 | A1 * | 4/2004 | Boucher et al. .......... 709/237 |
| 2004/0203481 | A1 * | 10/2004 | Park et al. ............. 455/74.1 |
| 2005/0005174 | A1 * | 1/2005 | Connors ................ 713/202 |
| 2006/0083187 | A1 * | 4/2006 | Dekel .................. 370/310 |
| 2006/0153107 | A1 * | 7/2006 | Ji ...................... 370/282 |
| 2007/0184837 | A1 * | 8/2007 | Hohl et al. ............. 455/435.1 |

OTHER PUBLICATIONS

Bluetooth Special Interest Group, Inc., Core Specification v2.0, pp. 189-196, http://www.bluetooth.com/Bluetooth/Technology/Building/Specifications/, Nov. 10, 2004.*

Qwest, "Call Waiting", available at URL http://www.qwest.com/residential/pdf/user_guides/english/CallWaiting.pdf, Feb. 12, 2005.*

* cited by examiner

*Primary Examiner* — Faruk Hamza
*Assistant Examiner* — Cassandra Decker
(74) *Attorney, Agent, or Firm* — Oblon, Spivak, McClelland, Maier & Neustadt, L.L.P.

(57) ABSTRACT

In a communication apparatus capable of switching states in response to a request from an external device, the communication apparatus switches states between said second state where the communication apparatus replies a valid response under limited circumstance and the third state where the communication apparatus does not reply a valid response before a registration; and said first state where the communication apparatus replies a valid response and said third state after the registration based on the same setting.

16 Claims, 14 Drawing Sheets

FIG. 17

COMMUNICATION
STATUS

VALID
(FIRST STATUS)
——————— REGISTRATION

↕ (AUTOMATIC)

WAITING FOR
REGISTRATION
(SECOND STATUS)
——————— DEREGISTRATION

INVALID
(THIRD STATUS)
- - - - - - - - - - - - - - - -

COMMUNICATION APPARATUS, METHOD FOR CONTROLLING COMMUNICATION APPARATUS, COMMUNICATION SYSTEM, PROGRAM AND MEDIUM

BACKGROUND OF THE INVENTION

1. Field of the Invention

The present invention generally relates to a communication apparatus that receives a request from an external device and reacts to the request, a method for controlling the communication apparatus, a system including the communication apparatus, a program that makes a computer function as the communication apparatus, and a medium that stores the program.

2. Description of the Related Art

Various communication apparatuses with functions to receive requests from an external device and conduct a process according to the requests and reply responses to the requests have been proposed. These functions are called request-dealing functions herein.

In consideration of security and processing load, some communication apparatuses have been provided with request-dealing functions that can be switched between valid and invalid, so as to turn into valid only when necessary.

Additionally, to switch valid and invalid by accessing from an external device, some communication apparatus provided with waiting-for-setting status besides valid and invalid have been proposed. Communication apparatuses in this waiting for setting status generally do not reply valid responses to requests from outside. However in a case that communication apparatuses receive requests to make request-dealing functions valid, communication apparatuses make request-dealing functions valid and reply accordingly.

The waiting for registration status is useful for, for example, a management system to make communication apparatuses conduct various processes from external devices using request-dealing functions of the communication apparatuses and manage communication apparatuses based on the results of the processes.

That is, as shown in FIG. 17, if factory default of a communication apparatus is waiting for setting (waiting for registration), by accessing from an external device to make a request-dealing function valid after a communication apparatus is installed in a user's office or the like; when the communication apparatus are shipped from a factory, the request-dealing function of the communication apparatus does not work. When the communication apparatus becomes a management subject, the communication apparatus is automatically set to work. Additionally, if the communication apparatus returns to waiting for registration status when the communication apparatus ceases to be a management subject, the request-dealing function returns to a valid state automatically when the communication apparatus becomes a management subject again.

On the other hand, if the request-dealing function is completely invalid, it is necessary to set manually in order to make the request-dealing function valid. Accordingly, by using the waiting for setting status, it is possible to reduce labor in registering a communication apparatus as a management subject of a management system.

Technologies regarding waiting for setting status of a request-dealing function are described in Japanese Laid-Open Application No. 2004-180276, for example.

However, a user of a communication apparatus does not want request-dealing functions of every communication apparatus to be valid. However, in the case communication apparatuses in waiting for setting status are shipped and installed in an environment where devices sending requests to make request-dealing functions valid exist, the request-dealing function may become valid contrary to a user's intention.

Additionally, in some cases, after the request-dealing function becomes valid once, it is not wanted to always allow for conducting a process according to a request from an external device. And in these cases, there are needs to make request-dealing functions valid only when necessary.

However, a method for controlling that utilizes a waiting-for-setting status like the communication apparatus described above, and solves the problem described above has not been known.

SUMMARY OF THE INVENTION

It is a general object of the present invention to provide a communication apparatus, a method for controlling the communication apparatus, a system including the communication apparatus, a program that makes a computer function as the communication apparatus, and a medium that stores the program, in which the above-mentioned problems are eliminated.

A more specific object of the present invention is to provide a communication apparatus, a method for controlling the communication apparatus, a system including the communication apparatus, a program that makes a computer function as the communication apparatus, and a medium that stores the program, in which the above-mentioned needs are met by easily and properly setting a function of a communication apparatus that receives a request and replies a response corresponding to the request.

The above objects of the present invention are achieved by a communication apparatus capable of switching states concerning a reaction to a request from an external device among first status where the communication apparatus replies a valid response; second status where the communication apparatus replies a valid response only when the communication apparatus receives a registration request; and third status where the communication apparatus does not reply a valid response; including: a transiting part for transiting said from second status to said first status when the communication apparatus receives said registration request; and a switching part for switching states between said second status and said third status before the transition and said first status and said third status after the transition based on the same setting.

Moreover, the above objects of the present invention are achieved by a communication apparatus capable of switching states concerning a reaction to a request from an external device among first status where the communication apparatus replies a valid response; second status where the communication apparatus replies a valid response only when the communication apparatus receives a registration request; and third status where the communication apparatus does not reply a valid response; including: transiting part for transiting from said first status to said second status when the communication apparatus receives a deregistration request; and switching part for switching states between said first status and said third status before the transition and said second status and said third status after the transition based on the same setting.

In the communication apparatus, said same setting is according to a user operation.

Furthermore, the above objects of the present invention are achieved by a method for a communication apparatus capable of switching states concerning a reaction to a request from an external device among first status where the communication apparatus replies a valid response; second status where the communication apparatus replies a valid response only when the communication apparatus receives a registration request; and third status where the communication apparatus does not reply a valid response, said method including the steps of: transiting said from second status to said first status when the communication apparatus receives said registration request; and switching states between said second status and said third status before the transition and said first status and said third status after the transition based on the same setting.

Moreover, the above objects of the present invention are achieved by a method for controlling a communication apparatus capable of switching states concerning a reaction to a request from an external device among first status where the communication apparatus replies a valid response; second status where the communication apparatus replies a valid response only when the communication apparatus receives a registration request; and third status where the communication apparatus does not reply a valid response, said method including the steps of: transiting from said first status to said second status when the communication apparatus receives a deregistration request; and switching states between said first status and said third status before the transition and said second status and said third status after the transition based on the same setting.

In the method, said same setting is according to a user operation.

Furthermore, the above objects of the present invention are achieved by a communication system, including: second communication apparatus, including: requesting part for sending a registration request to the first communication apparatus, and first communication apparatus capable of switching states concerning a reaction to a request from said second communication apparatus among first status where the first communication apparatus replies a valid response; second status where the first communication apparatus replies a valid response only when the communication apparatus receives said registration request; and third status where the first communication apparatus does not reply a valid response, including: a transiting part for transiting said from second status to said first status when the first communication apparatus receives said registration request; and a switching part for switching states between said second status and said third status before the transition and said first status and said third status after the transition based on the same setting.

Moreover, the above objects of the present invention are achieved by a communication system, including: second communication apparatus, including: requesting part for sending a deregistration request to the first communication apparatus, and first communication apparatus capable of switching states concerning a reaction to a request from said second communication apparatus among first status where the first communication apparatus replies a valid response; second status where the first communication apparatus replies a valid response only when the first communication apparatus receives said deregistration request; and third status where the first communication apparatus does not reply a valid response, including: a transiting part for transiting from said first status to said second status when the first communication apparatus receives said deregistration request; and a switching part for switching states between said first status and said third status before the transition and said second status and said third status after the transition based on the same setting.

In the system, said same setting is according to a user operation.

Furthermore, the above objects of the present invention are achieved by a program for causing a computer to function as a communication apparatus capable of switching states concerning a reaction to a request from an external device among first status where the communication apparatus replies a valid response; second status where the communication apparatus replies a valid response only when the communication apparatus receives a registration request; and third status where the communication apparatus does not reply a valid response, said program including the codes of: transiting from said first status to said second status when the communication apparatus receives a deregistration request; and switching states between said first status and said third status before the transition and said second status and said third status after the transition based on the same setting.

Moreover, the above objects of the present invention are achieved by a program for causing a computer to function as a communication apparatus capable of switching states concerning a reaction to a request from an external device among first status where the communication apparatus replies a valid response; second status where the communication apparatus replies a valid response only when the communication apparatus receives a registration request; and third status where the communication apparatus does not reply a valid response, said program including the codes of: transiting from said first status to said second status when the communication apparatus receives a deregistration request; and switching statuses between said first status and said third status before the transition and said second status and said third status after the transition based on the same setting.

In the program, said same setting is according to a user operation.

Furthermore, the above objects of the present invention are achieved by a computer-readable recording medium recorded with one of the programs above.

BRIEF DESCRIPTION OF THE DRAWINGS

In the following, embodiments of the present invention will be described with reference to the accompanying drawings.

FIG. 17 is a diagram showing an example of a status transition of a communication on a request-dealing function of a communication apparatus in the prior art.

DESCRIPTION OF THE PREFERRED EMBODIMENT

In the following, an embodiment of the present invention will be described with reference to the accompanying drawings.

Figure 1:
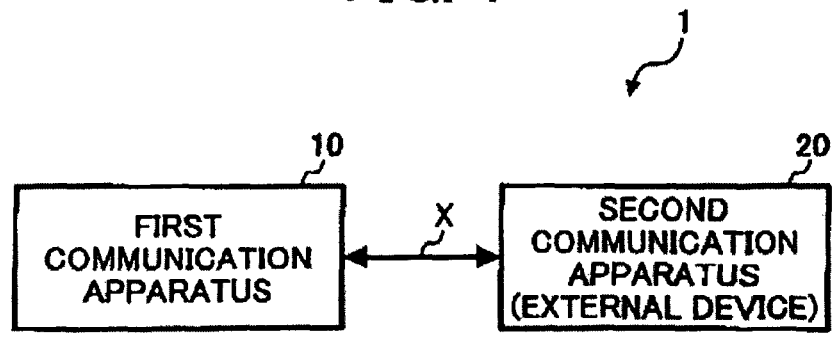
FIG. 1 is a diagram showing an example of a configuration of a communication system that is an embodiment of the present invention.

First, the configuration of the communication system, which is an embodiment of the present invention, is shown in FIG. 1.

As shown in FIG. 1, the communication system 1 includes a first communication apparatus 10 and a second communication apparatus 20, which can communicate mutually via a communication line X. As a communication line X, arbitrary media can be applied such as the Internet, LAN (local area network), or a telephone line. The communication line X is not limited to a fixed line, but can be a wireless line.

The first communication apparatus 10 includes a request-dealing function, which receives requests from external devices including the second communication apparatus 20, conducts a process according to the request, and sends a result of the process as the response to the request. As well as the image forming apparatus such as a printer, a facsimile, a digital copier, a scanner, a digital multi-functional apparatus, and a like, the first communication apparatus 10 can be various electronic apparatuses such as a network home appliance, a vending machine, medical equipment, a power unit, an air conditioning system, a measuring system for gas, water, electricity, or a like, an automobile, an aircraft, etc.

The second communication apparatus 20 corresponding to an external device includes a function that sends requests to the first communication apparatus 10 so that the first communication apparatus conducts a process according to the request, and receives the result of the process as the response to the request. Furthermore, the second communication apparatus 20 includes a function that sends the information concerning the first communication apparatus 10 to the first communication apparatus 10 to request registration for the second communication apparatus 20 itself. In this case, the registration is to identify a communication counterpart that is registered as an appropriate destination or source of transmissions.

Furthermore, the second communication apparatus 20 includes a function that requests the first communication apparatus 10 to deregister or notify a deregistration to the first communication apparatus 10. In this case, deregistration includes ceasing to identify a registered communication counterpart as an appropriate destination or source of transmissions.

Figure 2:
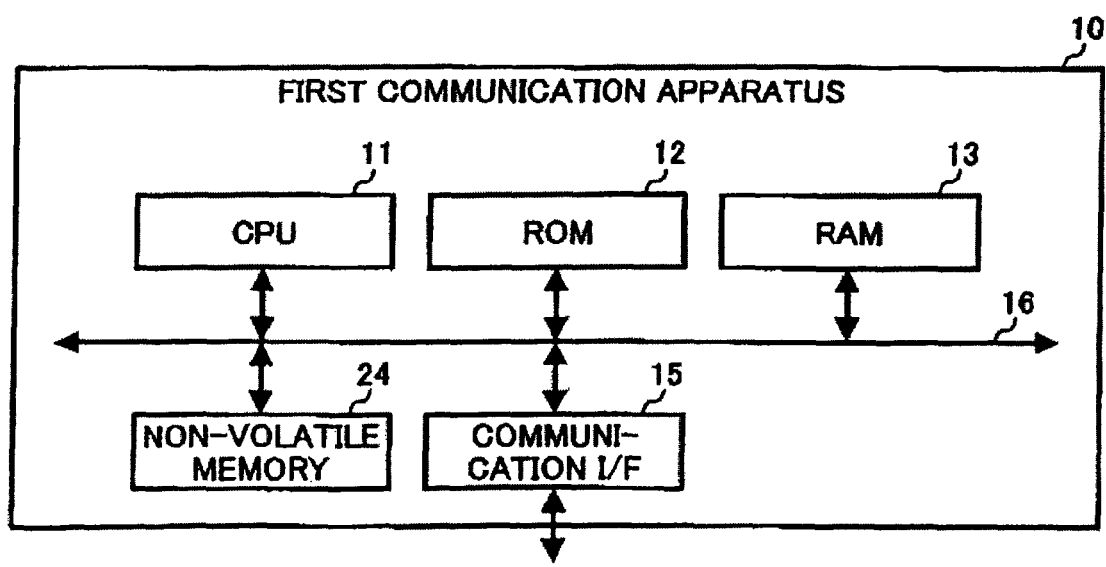
FIG. 2 is a diagram showing the hardware configuration of a first communication apparatus shown in FIG. 1.

FIG. 2 is a diagram of a hardware configuration of the first communication apparatus 10 shown in FIG. 1. As shown in FIG. 2, the first communication apparatus 10 includes a CPU (central processing unit) 11, a ROM (read only memory) 12, a RAM (random access memory) 13, a non-volatile memory 14, and a communication I/F (interface) 15, which are mutually connected via system bus 16.

The CPU 11 is a controlling part that controls the first communication apparatus 10 and functions as a switching part or the like by executing programs stored in the ROM 12 or the non-volatile memory 14.

The ROM 12 is a non-volatile storing part and stores programs executed by the CPU 11, static parameters, or the like. The ROM 12 may be a rewritable storing part so that stored data can be updated.

The RAM 13 is a storing part that stores temporary data or functions as a working memory for the CPU 11.

The non-volatile memory 14 is a rewritable non-volatile storing part such as a flash memory or a HDD (hard disc drive) and stores programs executed by the CPU 11 or parameters that are required to be stored after the apparatus is turned off.

The communication interface 15 is an interface to connect the first communication apparatus 10 to the communication line X and may be an Ethernet interface. This communication interface 15 and the CPU 11 function as a communicating part in communicating with other apparatuses via the communication line X. In addition, the communication interface 15 can be selected according to the interface standards of the apparatus, the protocols of the apparatus or a like. Furthermore, of course, the communication line X can be applied to a plurality of interface standards or protocols.

In addition, though not shown in FIG. 2, an output apparatus configured to, e.g., physical outputting copies of images, may be included with the first communication apparatus 10. For example, in the case that the first communication apparatus 10 is a multi-functional apparatus, this engine part will be an image forming part, an image reading part, a facsimile unit, or the like. And by the CPU 116 controlling these properly, the first communication apparatus 10 can perform functions such as copying, printing, scanning, or sending and receiving facsimiles.

In the communication system 1 described above, the first communication apparatus 10 has a setting, or a "communication status setting". By this setting, the first communication apparatus 10 can switch communication statuses of a request-dealing function among three statuses. In the following description, this communication status of a request-dealing function is called simply "communication status".

Figure 3:
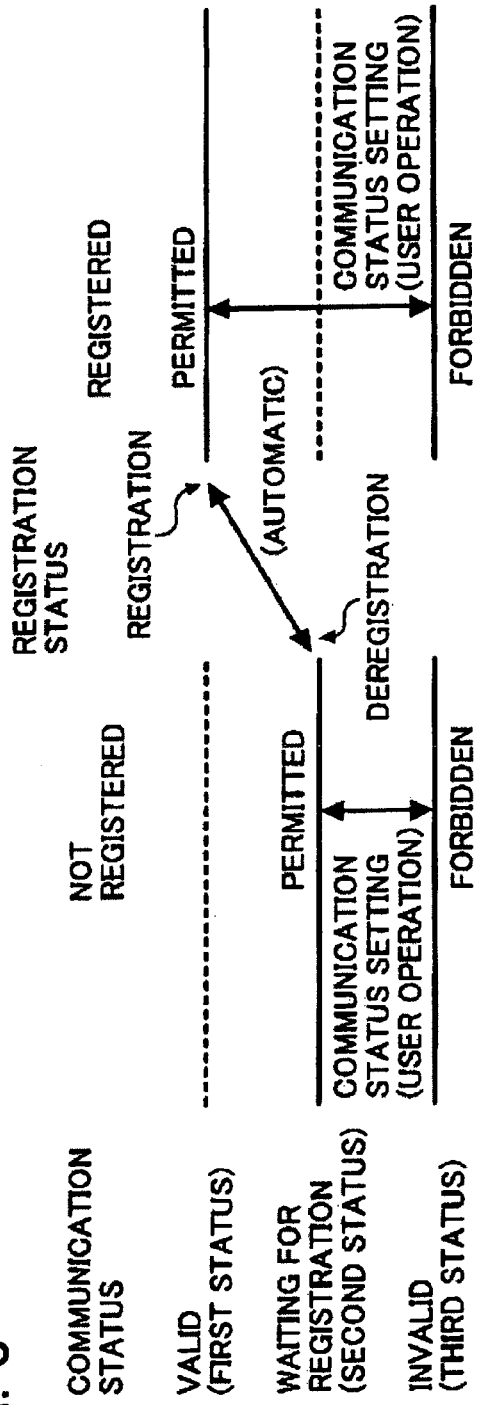
FIG. 3 is a diagram for explaining a setting for switching communication statuses of a first communication apparatus and communication statuses according to contents of the setting.

FIG. 3 shows a relation between the settings and statuses.

As shown in FIG. 3, the first communication apparatus 10 has three communication statuses, which are "valid", "waiting for registration," and "invalid". "Valid" is the first status in which the first communication apparatus 10 receives requests from external devices, conducts processes according to the requests, and replies with valid responses. "Waiting for registration" is the second status in which the first communication apparatus 10 replies with valid responses in response to requests from external devices only when it is necessary to turn into the "valid" status, or only when the first communication apparatus 10 receives the request concerning the process that turns the first communication apparatus 10 into the "valid" status. "Invalid" is the third status in which the first communication apparatus 10 does not reply to requests from external devices.

Then as for "registration status", "not registered" is a factory default and it automatically turns into "registered" after the first communication apparatus 10 is installed in a user site and conducts a process concerning a registration with the second communication apparatus 20. Moreover, this "registration status" automatically turns into "not registered" when the first communication apparatus 10 registered for the second communication apparatus 20 conducts a process concerning a deregistration with the second communication apparatus 20, and succeeds in the process.

As for "communication status setting", "permitted" is a factory default and it is switched by a user operation between "permitted" and "forbidden".

Figure 4:
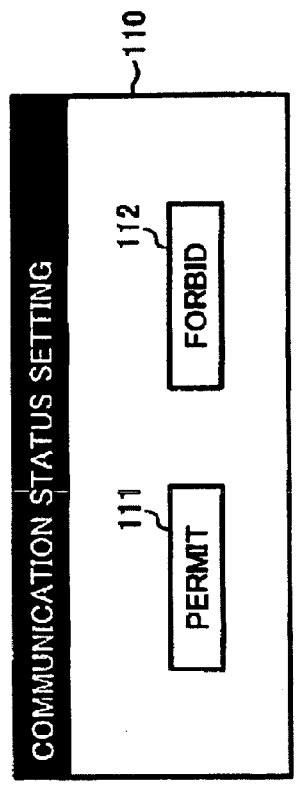
FIG. 4 is a diagram showing an example of an operational display for receiving instructions on a communication status setting.

FIG. 4 shows an example of an operation screen for "communication status setting". This screen or a similar screen may be shown in a display of the first communication apparatus 10 or on a display of a PC (personal computer) operating a browser that accesses the first communication apparatus 10. And a user can switch the setting between "permitted" and "forbidden" by pushing a permit button 111 or a forbidden button 112.

When the first communication apparatus 10 is "not registered" and "permitted" as a factory default, its communication status is "waiting for registration". After that, by conducting a process concerning a registration between the first and the second communication apparatus 20, "registration status" turns into "registered" and communication status turns into "valid".

Accordingly, at first, request-dealing functions other than a request-dealing function that deals with a process concerning a registration are invalid, and these request-dealing functions become valid automatically without a user operation.

In addition, when the first communication apparatus 10 is "not registered," by a user operation of switching the "communication status setting", the communication status can be switched between "waiting for registration" and "invalid". Accordingly, a user who does not want the first communication apparatus 10 to be registered for the second communication apparatus 20 can make the first communication apparatus 10 not conduct a process concerning a registration by setting the "communication status setting" to "invalid".

On the other hand, when the first communication apparatus 10 is "registered", by a user operation of switching the "communication status setting", the communication status can be switched between "valid" and "invalid". Accordingly, a user who wants the second communication apparatus 20 temporarily not to obtain information from the first communication apparatus 10, can make the first communication apparatus 10 not reply with valid responses to requests from the second communication apparatus 20 by setting the "communication status setting" to "invalid".

And in this case, because the "registration status" does not change, the first communication apparatus 10 can present itself as registered to the second communication apparatus 20 even when a communication status is "invalid". Accordingly, the communication status of the first communication apparatus 10 turns into "invalid" one-sidedly, identification of the "registration status" will not conflict. And in the case that the "communication status setting" turns into "valid" again, the first communication apparatus 10 can start working in cooperation with the second communication apparatus 20.

Of course, it is possible to turn back into "not registered" by conducting a process concerning deregistration. In this case, communication status turns from "valid" into "waiting for registration."

In addition, the operation described above may be conducted on the request-dealing function that deals with requests from the external devices that request the first communication apparatus 10 to be registered. Then, in the case that the communication status becomes "forbidden", the first communication apparatus 10 may receive and process requests from other external devices. For example, in the case that the first communication apparatus 10 is a multi-functional apparatus, it may receive print requests from a PC in a LAN (local area network) regardless of the above communication statuses. And for example, by establishing a system that has different communication paths (e.g., ports) for the second communication apparatus 20 and other external devices, these requests can be separated.

Next, operations and status transitions of the first communication apparatus 10 in each communication status described above will be described with respect to FIG. 5 to FIG. 9.

Figure 5:
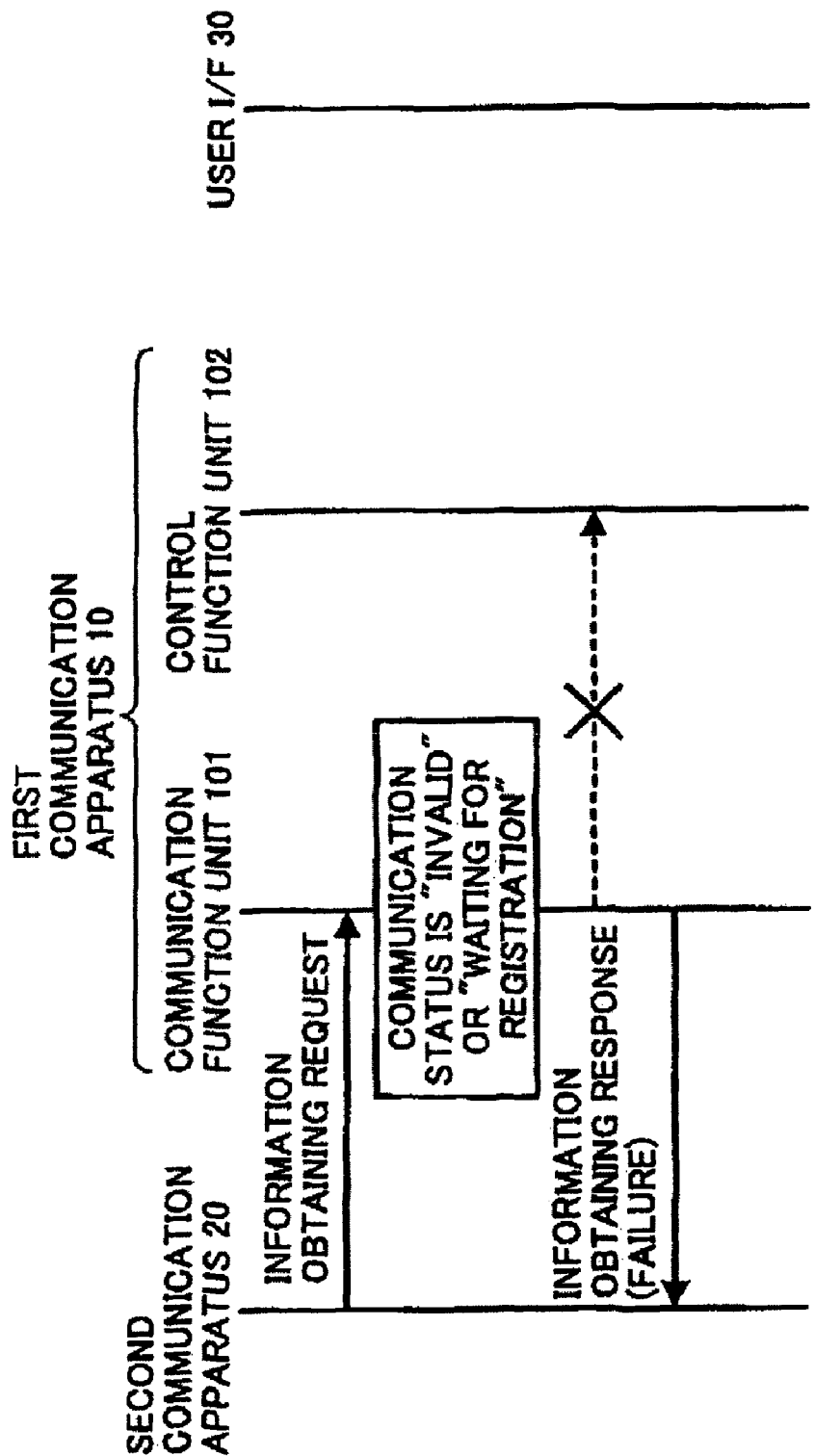
FIG. 5 is a diagram showing an example of an operation sequence when the communication status of a first communication apparatus is "invalid" or "waiting for registration", and the first communication apparatus receives requests other than a request concerning a registration from a second communication apparatus.

FIG. 5 shows an example of a process sequence in the case that the first communication apparatus 10 receives requests that are not concerning a registration when the communication status of the first communication apparatus 10 is "invalid" or "waiting for registration". In addition, a communication function unit 101 includes functions concerning sending and receiving of requests and responses, and a control function unit 102 includes functions other than the functions concerning sending and receiving of requests and responses, such as functions concerning conducting processes in response to requests, detecting user operations via user interface 30, and detecting status of the first communication apparatus 10 itself.

Additionally, for examples of user interface 30, an operation panel of the first communication apparatus 10, GUI (graphical user interface) of a browser, or a client software that are in a PC accessing to the first communication apparatus 10 may be applied. Though the user interface 30 may be a part of the first communication apparatus 10 in FIG. 5, an example is shown in which the user interface 30 is not a part of the communication apparatus 10.

As shown in FIG. 5, when the first communication apparatus 10 receives an information-obtaining request from the second communication apparatus 20, and the communication status of the first communication apparatus 10 is "invalid" or "waiting for registration", or not "valid", the first communication apparatus 10 replies with a NG (failure) response, or a response showing that the request-dealing function is invalid, as an information-obtaining response. Additionally, in this case, the communication function unit 101 does not report a reception of that request. Thus, the control function unit 102 does not conduct a process concerning the request.

Additionally, because the second communication apparatus 20, or the source of the request, receives a failure response, the second communication apparatus 20 can identify that the reason the second communication apparatus 20 cannot receive a normal response is not a reason such as a transmission error or a disconnection of the first communication apparatus 10, but that the request-dealing function of the first communication apparatus 10 is invalid. In addition, a process similar to the process above described may be conducted when the first communication apparatus 10 receives requests that use a request-dealing function other than an information-obtaining request.

Figure 6:
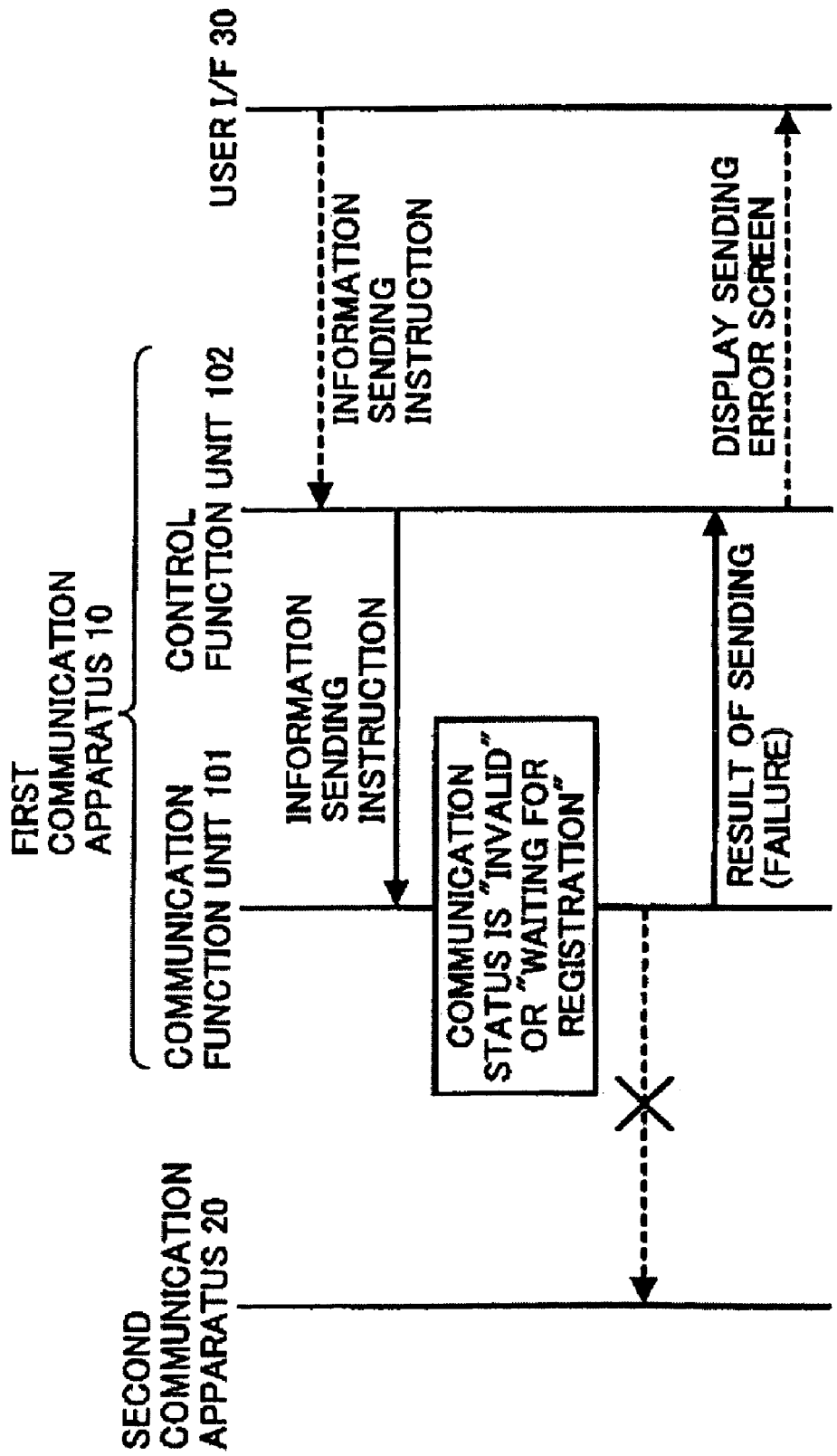
FIG. 6 is a diagram showing an example of an operation sequence when an event requiring sending a request to the second communication apparatus occurs in the first communication apparatus of which communication status is "invalid" or "waiting for registration"

Next, FIG. 6 is an example of a process sequence in the case in which the communication status of the first communication apparatus 10 is "invalid" or "waiting for registration", and an event that requires information to be sent to the second communication apparatus 20 occurs.

As shown in FIG. 6, when an event occurs such as an information sending instruction that a user requests via the user interface 30 to send information to the second communication apparatus 20, the communication status of the first communication apparatus 10 is "invalid" or "waiting for registration", or not "valid", the first communication apparatus 10 does not send information to the second communication apparatus 20.

In this case, the control function unit 102 detects an event and instructs the communication function unit 101 to send information. However the communication function unit 101 denies and notifies a failure of sending information to the control function unit 102. Also, in this case, this failure may be distinct from a transmission error.

Moreover, events to be sent to the second communication apparatus 20 are not limited to detecting an instruction via a user interface 30, but may be events occurring inside of the first communication apparatus 10, such as detecting an error in an engine part. Additionally, sending a transmission error to the user interface 30 is optional. A broken line between the user interface 30 and the control unit 102 in FIG. 6 means that the transmission is optional.

Figure 7:
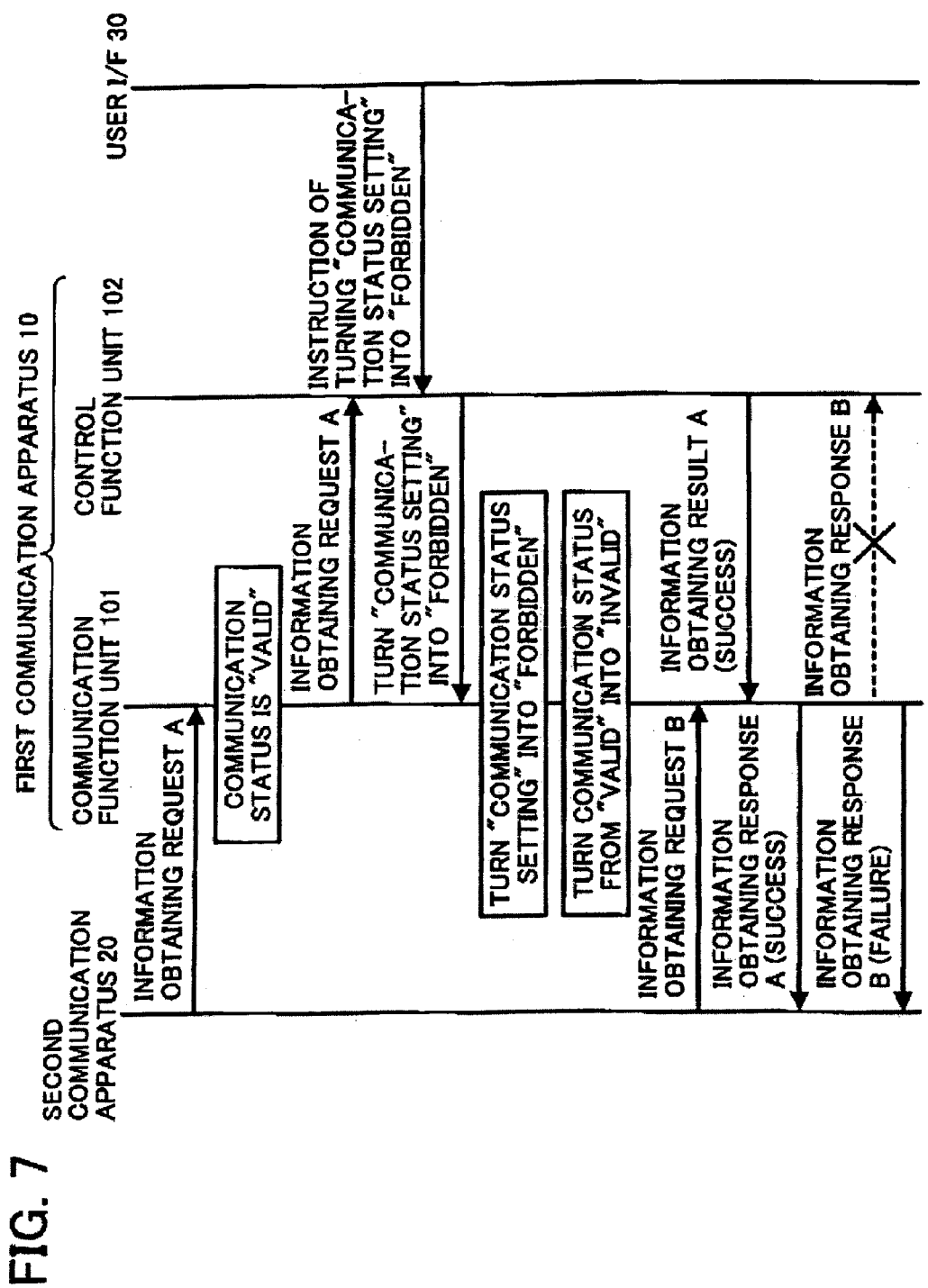
FIG. 7 is a diagram showing an example of a communication status that turns from "valid" into "invalid" by switching a communication status setting.

Next, FIG. 7 is an example of a process sequence in which the communication status turns from "valid" into "invalid" by switching the "communication status setting".

An example shown here is a case that the communication status is "valid" when an information obtaining request A is received, then the "communication status setting" is switched to "forbidden" according to an instruction from the user interface 30, so that communication status turns from "valid" into "invalid".

In this case, the communication function unit 101 of the first communication apparatus 10 conveys information-obtaining request A, which is received while the communication status is "valid", to the control function unit 102, conducts a process such as collecting information according to this request A, and replies a result to the communication control unit 101. Then, the communication control unit 101 replies, as a response to the information-obtaining request A, an information-obtaining response A, including information indicating a requested process is successful and contents of the requested information. This response is sent even if the communication status is "invalid" at the time of responding.

On the other hand, as for a information obtaining request B, similar to the case shown in FIG. 5, because the communication status is "invalid" when the first communication apparatus 10 receives a information obtaining request B, a failure response that indicates that a request-dealing function is invalid is sent.

Figure 8A:
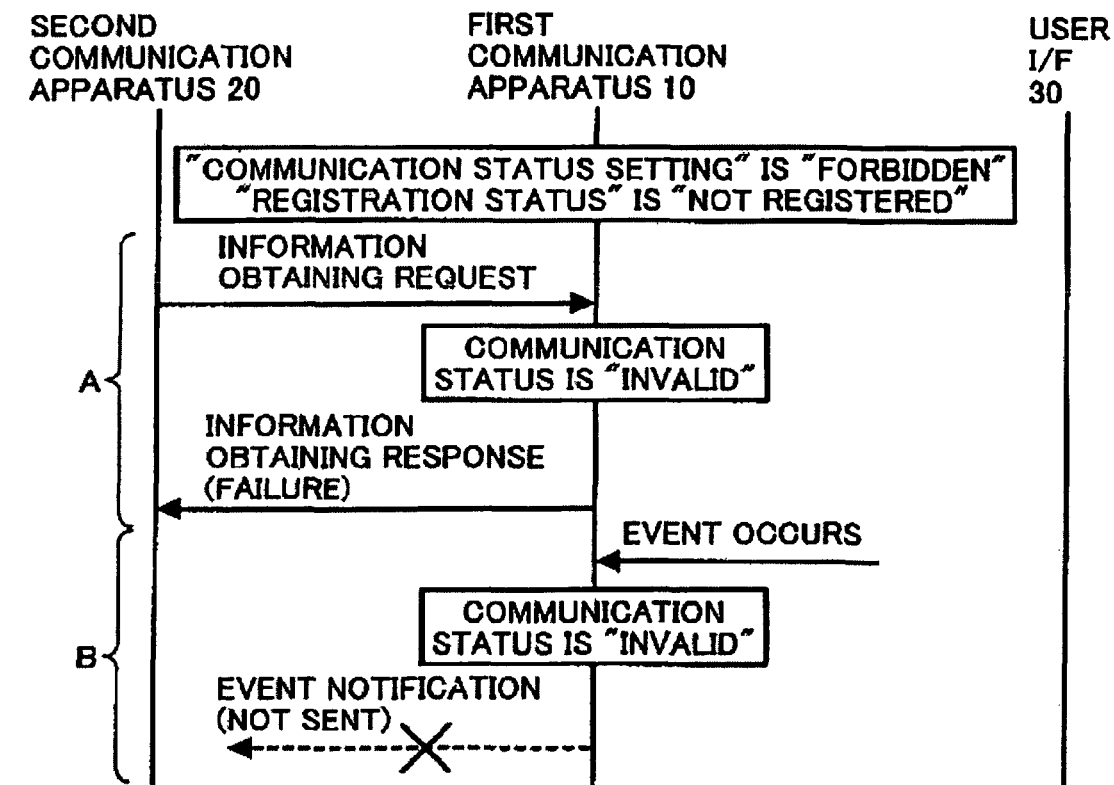
FIG. 8 is a diagram showing examples of operations when a "registration status" is "not registered"
Figure 8B:
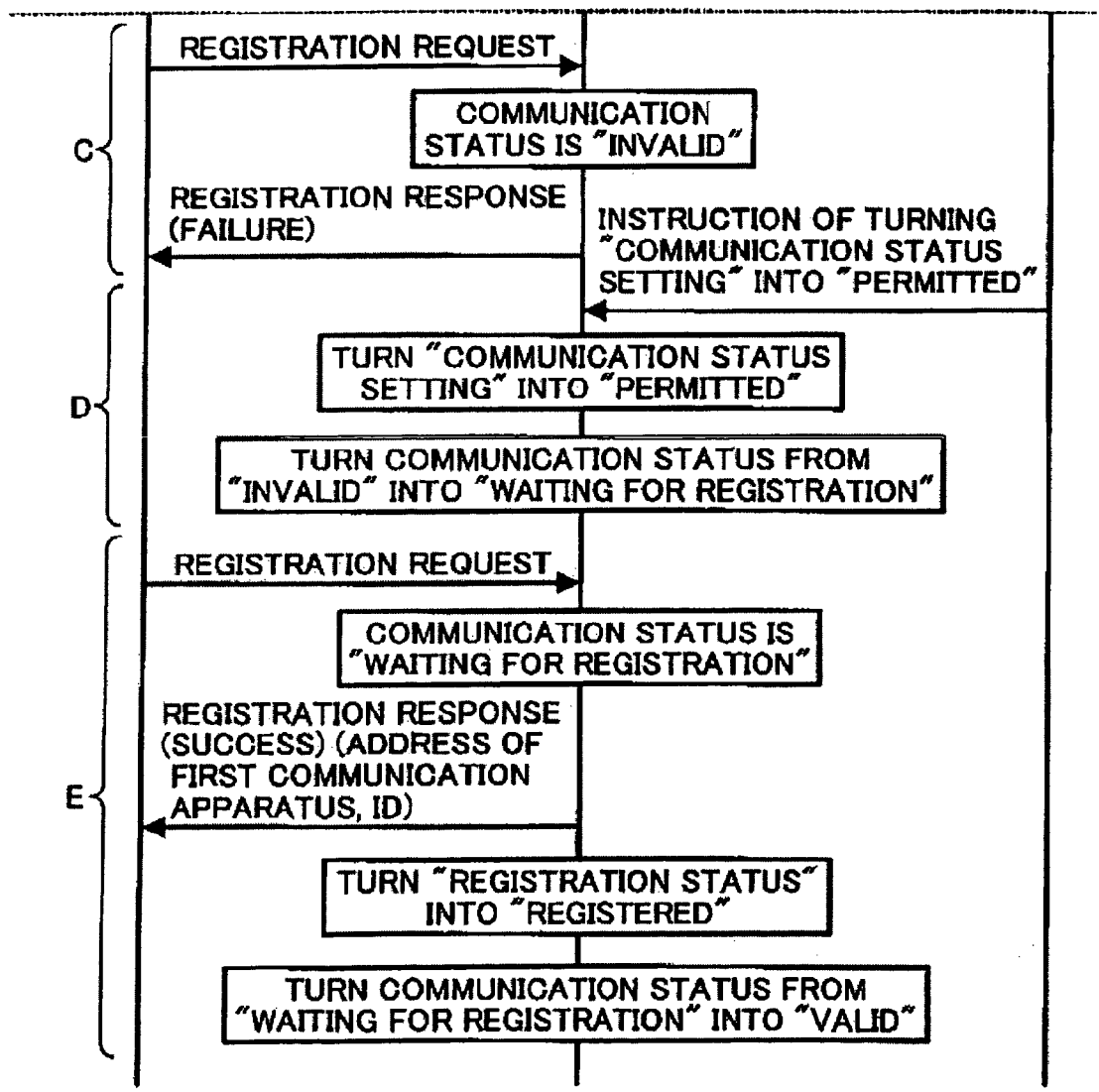

Next, FIG. 8 is an example of operations in the case that the "registration status" is "not registered". In this diagram, to make it easy to understand, the first communication apparatus 10 is not divided into the communication function unit 101 and the control function unit 102. However, in practice, the communication function unit 101 and the control function unit 102 conduct each process similarly to that shown in FIG. 5 to FIG. 7.

At first, if the "communication status setting" of the first communication apparatus 10 is "forbidden", the communication status is "invalid," and as explained with FIG. 5, the first communication apparatus 10 replies with a failure response to the second communication apparatus 20 (A).

Also, as explained with regard to FIG. 6, the first communication apparatus 10 does not send information in the case that an event occurs that requires information to be sent to the second communication apparatus 20 (B).

In addition, in this state, the first communication apparatus 10 replies with a failure response to a registration request of the first communication apparatus 10 for the second communication apparatus 20, or the request to turn the communication status into "valid", (C).

However, if a user instructs the "communication status setting" to be "valid", the first communication apparatus 10 turns the "communication status setting" into "permitted." Thus, the communication status turns from "invalid" into "valid" (D).

And in this state, if the first communication apparatus 10 receives a registration request from the second communication apparatus 20, the first communication apparatus 10 conducts necessary processes according to the request and replies with a success response. This response may include an address, an ID, etc. of itself. Accordingly, after replying a registration response indicating a success, the first communication apparatus 10 turns a setting of "registration status" into "registered" as it is registered for the second communication apparatus 20. Accordingly, the communication status turns from "waiting for registration" into "valid," and subsequently the first communication apparatus 10 replies a valid response to a request of the second communication apparatus 20 (E).

Figure 9:
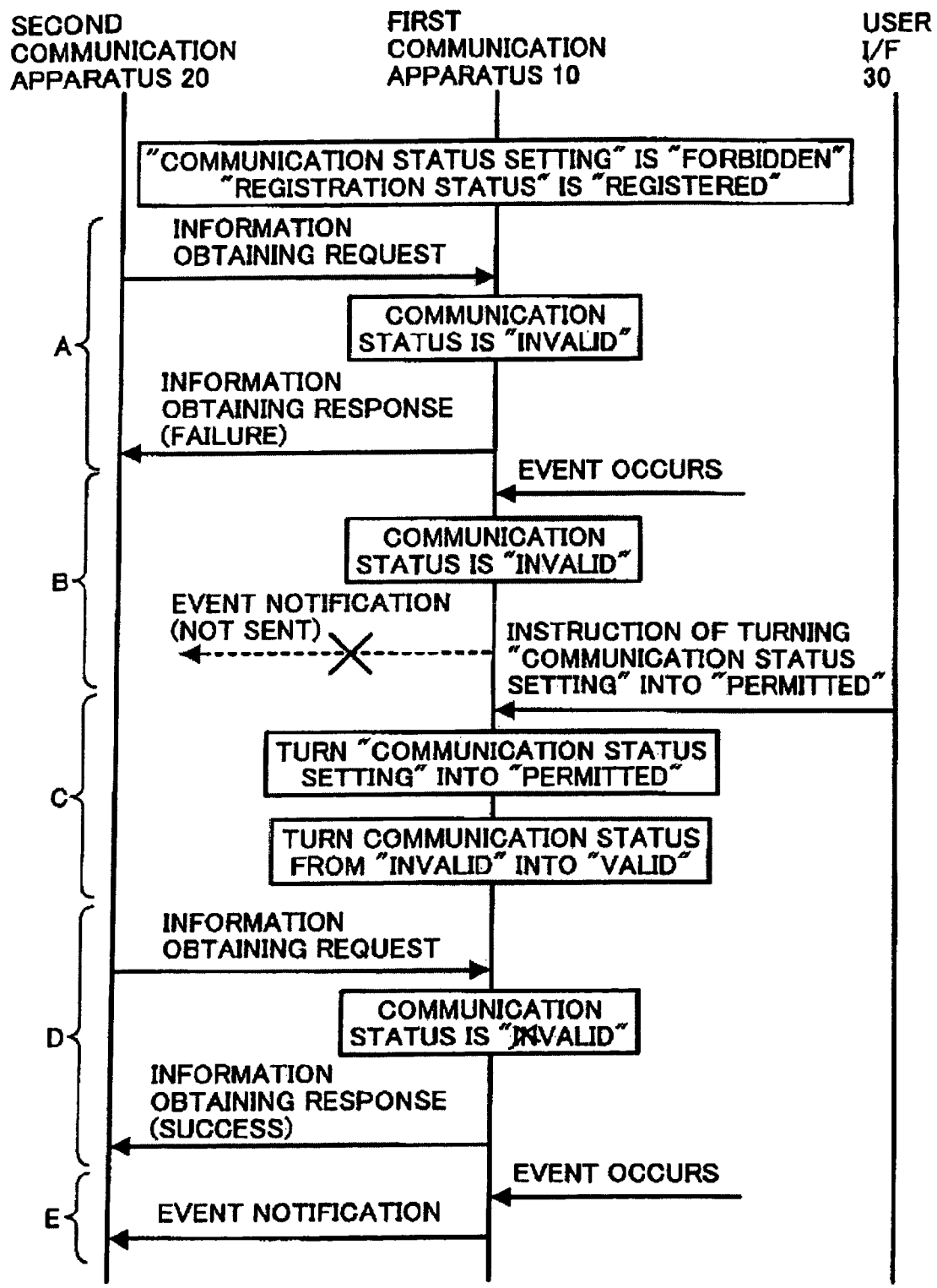
FIG. 9 is a diagram showing examples of operations when a "registration status" is "registered"

Next, FIG. 9 shows an example of operations in the case that the "registration status" is "registered".

At first, if the "communication status setting" of the first communication apparatus 10 is "forbidden", the communication status is "invalid," even if the "registration status" is "registered" and, as explained with regard to FIG. 5, the first communication apparatus 10 replies with a failure response to the second communication apparatus 20 (A). Also, as explained with regard to FIG. 6, the first communication apparatus 10 does not send information when an event occurs that requires information to be sent to the second communication apparatus 20 (B).

But, if a user instructs the "communication status setting" to be "valid", the first communication apparatus 10 turns the "communication status setting" into "permitted" therefore the communication status turns from "invalid" into "valid" (C).

And in this state, in the case that the first communication apparatus 10 receives requests from the second communication apparatus 20, the first communication apparatus 10 conducts necessary processes according to the request and replies a success response (D). Additionally, when an event that requires information to be sent to the second communication apparatus 20 occurs, the first communication apparatus 10 sends information (E).

Figure 10:
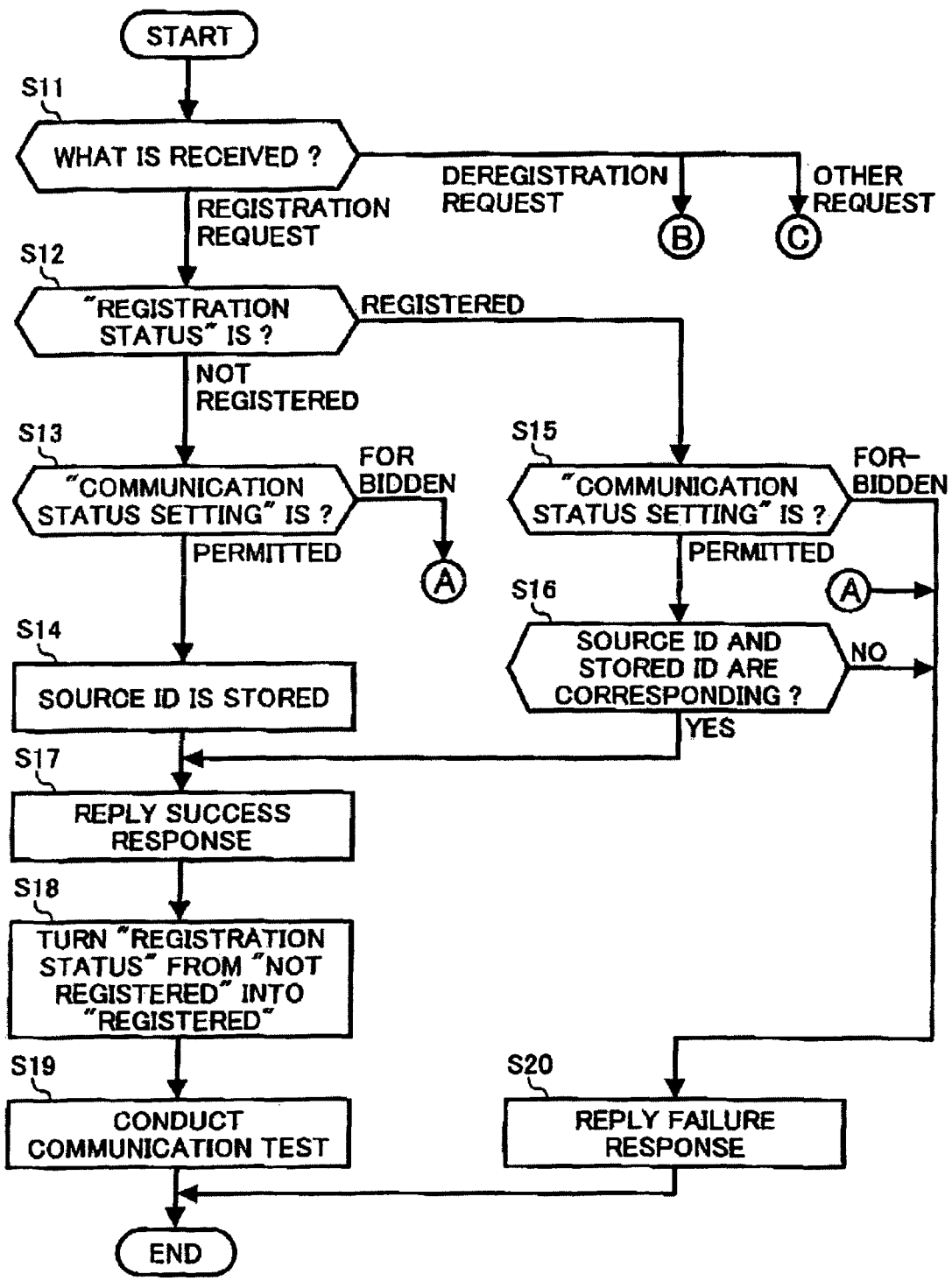
FIG. 10 is a flowchart showing a part of an operation executed by a CPU of the first communication apparatus when the CPU receives a request from the second communication apparatus via a predetermined port.
Figure 11:
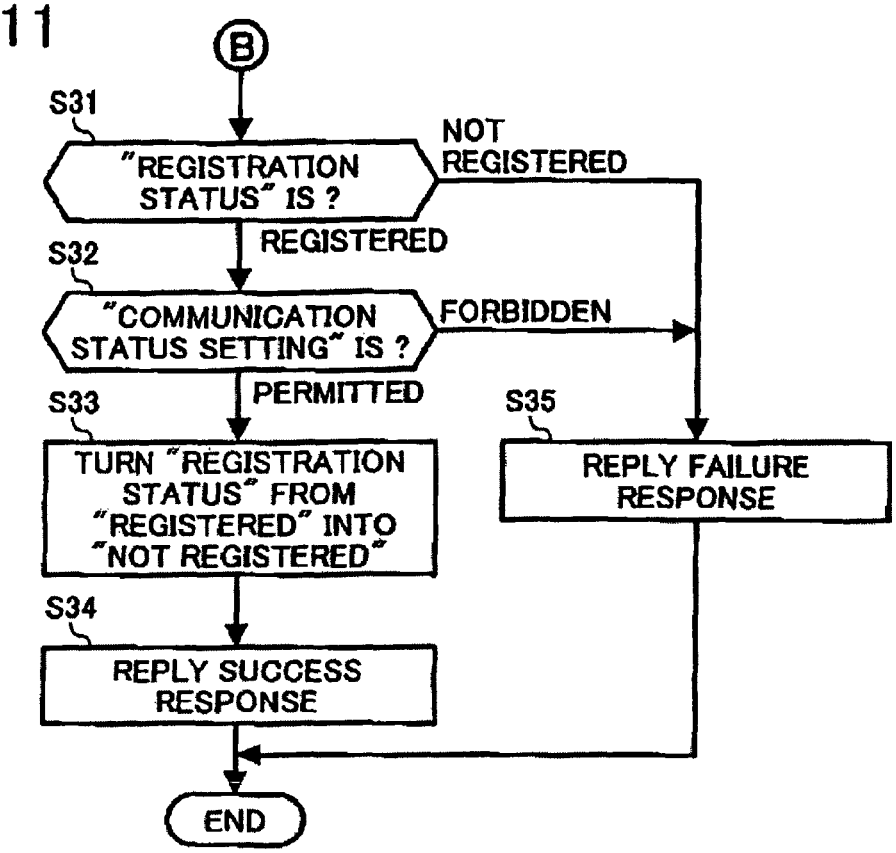
FIG. 11 is a continuation flowchart of the operation in FIG. 10.
Figure 12:
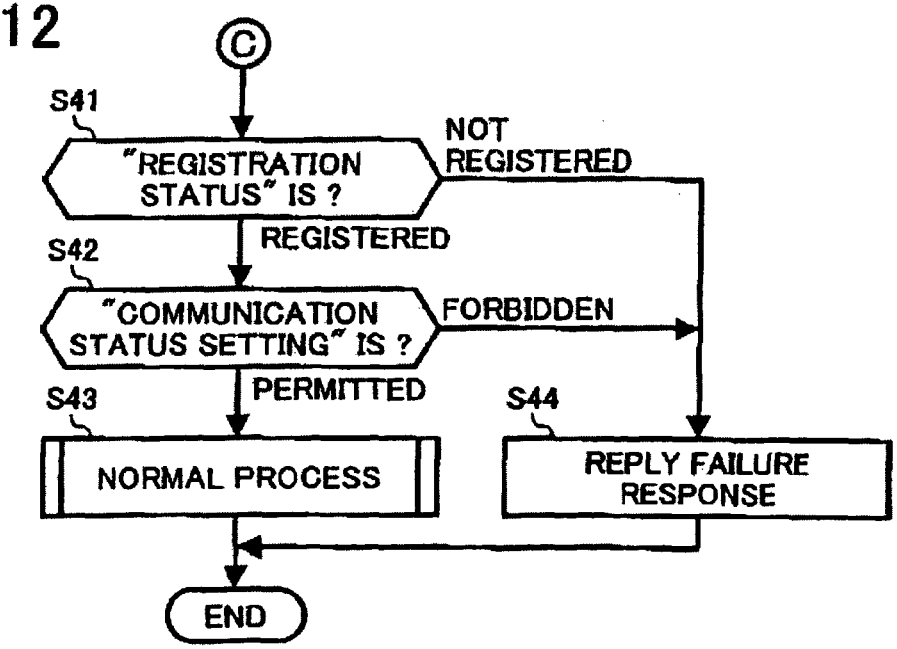
FIG. 12 is a continuation flowchart of the operation in FIG. 10.

FIGS. 10-12 are flowcharts of processes conducted by the CPU 11 in the first communication apparatus 10 described above, when the CPU 11 receives a request from the second communication apparatus 20 via a predetermined port. By executing predetermined programs, the CPU 11 conducts the following processes in each flowchart. Additionally, processes shown in these flowcharts include processes concerning registration and deregistration, as described above.

During operations, the CPU 11 in the first communication apparatus 10 is always monitoring reception of requests or notifications via the communication interface 15. And when the CPU 11 receives these via the above-described port, the CPU 11 starts a process shown in the flowchart of FIG. 10. In addition, when the CPU 11 receives these via other ports, the CPU 11 conducts other processes, and these processes are the same as well-known processes, so the explanation thereof is omitted.

In FIG. 10, in step S11, what is received is determined. If what is received is a registration request, the process advances to step S12.

In step S12, referring to the "registration status", when the "registration status" is "not registered", a process advances to step S13. In step S13, if the "communication status setting" is "permitted", the communication status is "waiting for registration" so that to conduct a process concerning registration according to a registration request, the process advances to step S14.

In step S14, as destination information, an ID (for example, a serial number) of the second communication apparatus 20 that is the source of a registration request is stored in non-volatile memory 14. And by this process, the second communication apparatus 20 that is the source of a registration request is identified as an appropriate communication counterpart (a destination or a source of requests). Moreover, in this process, an IP address of the second communication apparatus 20 may be stored.

In the next step S17, the first communication apparatus 10 sends a success response to the second communication apparatus 20.

Then in step S18, the "registration status" of the first communication status turns from "not registered" into "registered," the communication status turns from "invalid" into "valid," and the first communication apparatus 10 can receive requests from the second communication apparatus 20. Therefore, subsequently, the first communication apparatus 10 replies with a valid response to a request from the second communication apparatus 20. This step S18 is a transiting step and the CPU 11 functions as a transiting part.

In step S19, the first communication apparatus 10 conducts a communication test to determine whether or not appropriate sending and receiving of requests or responses are possible, and the process ends. Step S19 is optional.

Additionally, in step S13, if the "communication status setting" is "forbidden", the communication status is "invalid" and the process advances to step S20.

In step S20, the first communication apparatus 10 replies with a failure response and the process ends.

On the other hand, in step S12, if the "registration status" is "registered", the process advances to step S15 and the "communication status setting" is referred to. And if the "communication status setting" is "permitted", the communication status is "valid", or the second communication apparatus 20 is already registered as a communication counterpart and the process advances to step S16.

In step S16, an ID of the source of the request is compared with the ID of the communication counterpart stored in step S14. If these are corresponding, the second communication apparatus 20 that is the source is already identified as a communication counterpart. Thus, the process advances to step S17.

In step S17, the first communication apparatus 10 replies with a success response and conducts following processes. In this case, step S18 may be omitted. Moreover, in step S16, in addition to or instead of the ID, an IP address may be applied.

Additionally, in step S15, if the "communication status setting" is "forbidden", the communication status is "invalid" and the process advances to step S20. In step S20, the first communication apparatus 10 replies with a failure response as a registration response and the process ends.

If, in step S16, the IDs are not corresponding, or the first communication apparatus 10 receives a registration request from an external device that is different from the second communication apparatus 20 that is already identified as a communication counterpart, the first communication apparatus 10 replies with a failure response and ends the process, similarly to the case that the communication status is "invalid" because, in this embodiment, only one external device is registered as a communication counterpart in the first communication apparatus 10.

Additionally, in the case that a plurality of external devices can be registered, if, in step S15, the "communication status setting" is "permitted", the process advances to step S14.

Additionally, in step S11, if what is received is a deregistration request, the process advances to step S31 in FIG. 11. Here, a deregistration request is a command that the second communication apparatus 20 requests the second communication apparatus 20 to go out of its communication counterpart.

In step S31, referring to the "registration status", if the "registration status" is "registered", the process advances to step S32.

In step S32, referring to the "communication status setting", if the "communication status setting" is "permitted", the communication status is "valid", or the first communication apparatus 10 conducts a process concerning a received request. Thus, in step S33, the "registration status" turns from "registered" into "not registered". Thus, the communication status turns from "valid" into "waiting for registration". At this time, an ID of the second communication apparatus 20 stored as destination information may be deleted. This step S33 is also a transiting step and the CPU 11 functions as a transiting part.

Subsequently, in step S34 the first communication apparatus 10 replies with a success response as a deregistration response to a deregistration request and ends the process. Receiving this response, the second communication apparatus 20 can realize that the first communication apparatus 10 went out of its communication counterpart. However, by sending a registration request to the first communication apparatus 10 again, the second communication apparatus 20 can register the first communication apparatus 10 as its communication counterpart.

Additionally, in step S31, if the "registration status" is "not registered", without referring to the "communication status setting", the first communication apparatus 10 does not reply with a valid response to a deregistration request from the second communication apparatus 20. Therefore, the process advances to step S35 and the first communication apparatus 10 replies with a failure response as a deregistration response and ends the process. Also, in step S32, if the "communication status setting" is "forbidden", the communication status is "invalid." Thus, the first communication apparatus 10 replies with a failure response in step 35 and ends the process.

In step S11, when what is received is not a registration request or a deregistration request, the process advances to step S41. Then, similarly to step S31, referring to the "registration status", if the "registration status" is "registered", the process advances to step S42.

In step S42, referring to the "communication status setting", if the "communication status setting" is "permitted", the communication status is "valid", and the first communication apparatus 10 conducts a process concerning a received request. Therefore in step S43, the first communication apparatus 10 conducts a normal process according to the request and ends the process. This process, for example, is a process that replies with information that is requested in an information-obtaining request.

On the other hand, in step S41, if the "registration status" is "not registered", without referring to the "communication status setting", the first communication apparatus 10 does not reply with a valid response to a deregistration request from the second communication apparatus 20. Therefore the process advances to step S44 and the first communication apparatus 10 replies with a failure response as a deregistration response and ends the process. Also, in step S42, if the "communication status setting" is "forbidden", the communication status is "invalid" and the first communication apparatus 10 replies with a failure response in step 44 and ends the process.

Additionally, before the process shown in FIG. 11 and FIG. 12, similarly to step S16 in FIG. 10, the first communication apparatus 10 may conduct a process comparing an ID of the source of the request with the ID of the communication counterpart. If these are not corresponding, the first communication apparatus 10 may reply with a failure response.

The process described above enables the first communication apparatus 10 to turn the communication status from "waiting for registration" into "valid" if it receives predetermined data, or a registration request. Besides, the first communication apparatus 10 can respond appropriately to requests received from the second communication apparatus 20 according to its communication status.

Figure 13:
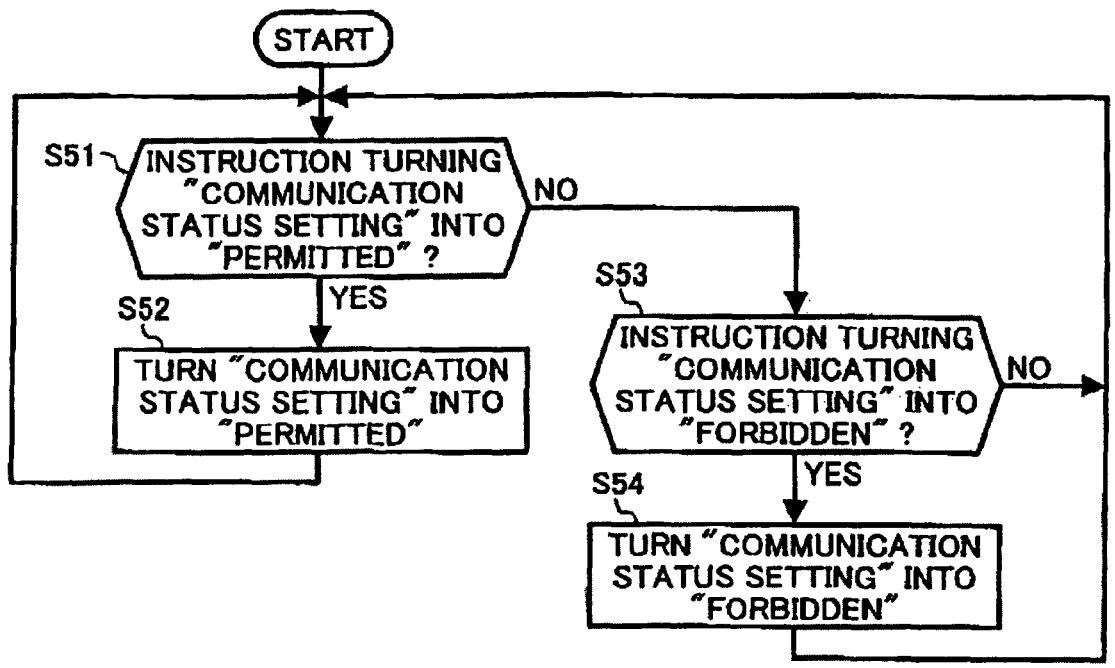
FIG. 13 is a flowchart showing an operation executed by a CPU of the first communication apparatus for controlling the communication status setting.

Next, FIG. 13 shows a flowchart of a process that the CPU 11 of the first communication apparatus 10 executes so as to control the contents of the "communication status setting".

When the apparatus is activated, the CPU 11 of the first communication apparatus 10 starts a process shown in the flowchart in FIG. 13.

In step S51, it is determined whether or not there is an instruction of switching the "communication status setting" into "permitted". If yes (there is an instruction) the process advances to step S52, the "communication status setting" is turned into "permitted," and the process returns to step S51 and repeats.

If there is not an instruction, the process advances to step S53. In step S53, it is determined whether or not there is an instruction of switching the "communication status setting" into "forbidden". If yes, the process advances to step S54 and the "communication status setting" turns into "forbidden". Then the process returns to step S51 and repeats.

By conducting the process described above, a single setting, or the "communication status setting", is switched by a user operation between "permitted" and "forbidden". Regardless of a state of the "registration status", referring to a single setting, or the "communication status setting", the communication status transits. Thus, if the "registration status" is "not registered", the communication status can be switched between "waiting for registration" and "invalid". And if the "registration status" is "registered", the communication status can be switched between "valid" and "invalid".

This process is a switching step, and in this step, the CPU 11 functions as a switching part.

Additionally as described above, by using two parameters, or a "registration status" and a "communication status setting", the communication status of the first communication apparatus 10 is switched among "valid", "waiting for registration," and "invalid". This enables the effect explained above with regard to FIG. 3 to be obtained.

Moreover, even though the contents of the "communication status setting" are decided based on a logical operation of a plurality of switches, if the process described above is conducted according to the "communication status setting", the "communication status setting" is still a single setting.

And now as a comparative example of the embodiment described above, besides the automatic registration function shown in FIG. 19, the communication status may be switched directly by a user operation.

Figure 14:
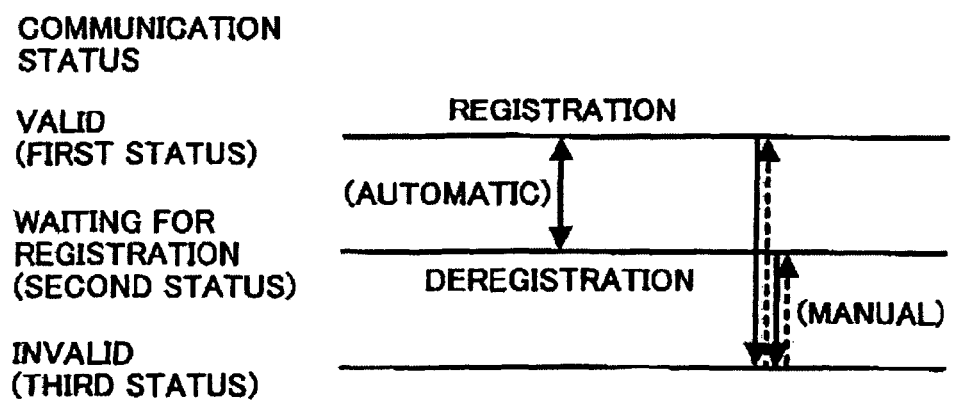
FIG. 14 is a diagram showing an example of a status transition of a communication status in a communication apparatus of a comparative example.

FIG. 14 is an example of state transitions in this case.

As shown in FIG. 14, in the case that the communication status can be switched by a user operation, the communication status turns from "valid" or "waiting for registration" into "valid". However, in this case, when the communication status is "invalid", it is not clear that the communication status was "valid" or "waiting for registration" before. Therefore, when a user starts using communication status again, a user must determine that the communication status should return to "valid" or "waiting for registration".

And if the communication status remains "invalid" for a long time, a user might forget to which status the communication status should return, or whether the first communication apparatus 10 is registered for the second communication apparatus 20 or not. A broken line in FIG. 14 indicates that the user must manual switch the status in this embodiment. And if a user switches into a wrong status, it is possible that they cannot operate properly because of a conflict regarding an existence of the registration between the first communication apparatus 10 and the second communication apparatus 20.

For example, in the case that the communication status should return to "valid" and a user switched into "waiting for registration", the first communication apparatus 10 identifies itself not registered and, on the other hand, the second communication apparatus 20 identifies the first communication apparatus 10 as registered. And in this case, generally the second communication apparatus 20 does not send a registration request again. Thus, the communication status of the first communication apparatus 10 never returns to "valid".

On the other hand, in the case that the communication status should return to "waiting for registration" and a user switched into "valid", the first communication apparatus 10 tries to conduct a process such as an event notification. However, the second communication apparatus 20 does not identify the first communication apparatus 10 as a communication counterpart so that the second communication apparatus 20 might reply with a failure response. In addition, the first communication apparatus 10 does not store an ID of the second communication apparatus 20, therefore the first communication apparatus 10 might not know the destination.

As described above, if the communication status is switched by a user operation, the communication system 1 may have troubles. Therefore, as explained with regard to FIG. 3, it is preferable that a user only switches the "communication status setting" so that the first communication apparatus 10 sets its communication status by itself.

However, it is possible that no problem occurs in the communication system 1, even if a user who has enough knowledge of a system, for example, a system administrator or a service engineer, is allowed to switch communication status directly.

Accordingly, a user, certified as an administrator or a service engineer by a password or some certification information in a memory card or IC card, etc. may be allowed to manually switch the communication status shown in FIG. 14. In addition, such a user may be allowed to manually switch the communication status between "waiting for registration" and "valid" so as to switch among "valid", "waiting for registration," and "invalid". This improves the flexibility of setting in the first communication apparatus 10.

In the embodiment described above, the configuration of the communication system, detailed processes, and a communication protocol etc. are not limited to the specifically described embodiment.

For example, the plurality of first communication apparatuses 10 or second communication apparatuses 20 may be installed in the communication system 1. And the second communication apparatus 20 may intermediate the transmission between the first communication apparatus 10 and other communication apparatuses.

Figure 15:
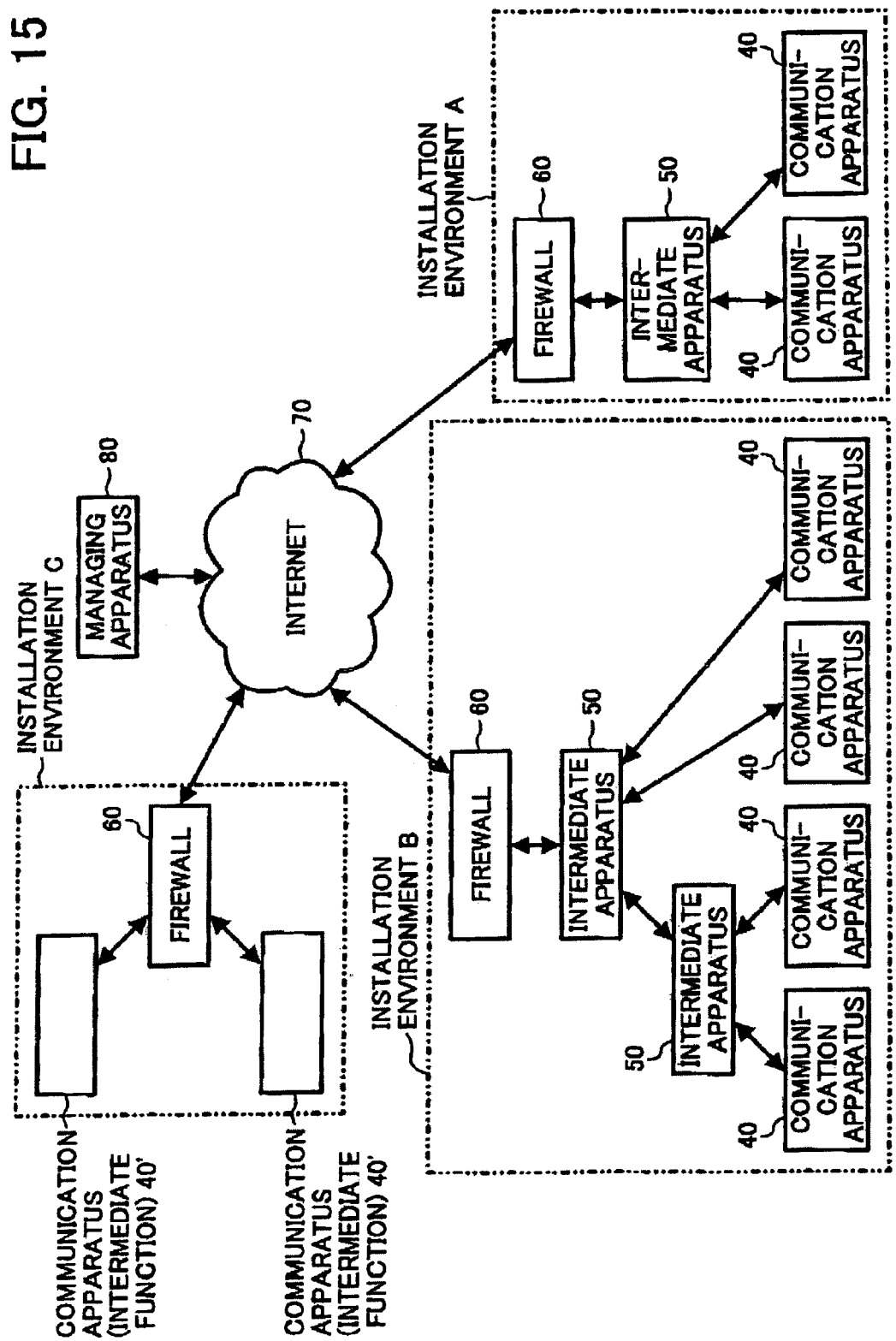
FIG. 15 is a diagram showing another example of a configuration of a communication system that is an embodiment of the present invention.

Here, another example of the configuration of the communication system 1 is shown in FIG. 15.

The communication system shown in FIG. 15 is a remote management system in which the managing apparatus 80 manages remotely a plurality of communication apparatuses 40 as managed apparatuses.

This remote management system includes managing apparatus 80, a plurality of communication apparatuses 40, and intermediate apparatuses 50 that intermediate the transmission among the communication apparatus 40. The intermediate apparatuses 50 and communication apparatuses 40 are installed in the installation environment at a user site, and the management apparatus 80 communicates with each communication apparatus 40 so as to manage each communication apparatus 40 remotely and intensively.

Additionally, in this system, each intermediate apparatus 50 and communication apparatus 40 in the installation environment are connected via the LAN and also can communicate via the LAN. For secure communications, a firewall 60 is provided to connect the LAN to the Internet 70.

Moreover, in an installation environment A and B, the communication apparatuses 40 correspond to the first communication apparatuses 10 in the embodiment described above and the intermediate apparatuses 50 correspond to the second communication apparatuses 20 as well. Each intermediate apparatus 50 registers the communication apparatuses 40 (or other intermediate apparatuses 50) so that the intermediate apparatus 50 intermediates the transmission. And intermediate apparatuses 50 intermediate the transmission between the managing apparatus 80 (or other intermediate apparatuses 50).

Additionally, the communication apparatus 40' in an installation environment C includes functions of both the communication apparatus 40 and the intermediate apparatus 50. In this case, the communication apparatus 40' can be said to correspond to both the first and second communication apparatuses 20 or the managing apparatus 80 can be said to correspond to the second communication apparatus 20.

In this remote management system, the managing apparatus 80 and the intermediate apparatuses 50 register the intermediate apparatuses 50 and the communication apparatuses 40 as communication counterparts and send requests to the registered apparatuses so as to request to conduct processes necessary for remote management. Moreover, the communication apparatuses 40 register the intermediate apparatuses and the management apparatus, and when an event occurs in the apparatus, the communication apparatus may notify the event to the intermediate apparatuses 50 or the management apparatus 80 actively.

The remote management here means obtaining information from a management subject and operates based on the information. For example, the management subject is an image processing device, the remote management is operations such as (1) collecting image forming counts in each management subject apparatus according to an error notification from the management subject, (2) notifying to a service center and calling a service person, (3) obtaining firmware version information of the management subject and if the version is not newest, updating the firmware by sending a new firmware, etc. In addition, the remote management includes operations that store information obtained from the management subject (for example, logging the operational log). These operations can be achieved by the managing apparatus 80, the intermediate apparatuses 50, and the communication apparatuses 40 sending and receiving the requests and responses thereof so as to conduct processes cooperatively.

Additionally, requests or responses described above in a communication system may be XML (extensible markup language) messages according to SOAP (simple object access protocol) and sent as HTTP (hypertext transfer protocol) messages.

Of course, this invention can be applied to the communication system above.

Moreover, this invention can be applied to any communication apparatuses. As well as the image forming apparatus such as a printer, a facsimile, a digital copier, a scanner, a digital multi-functional apparatus, etc., the communication apparatus can be various electronic apparatuses provided with communication functions including a network home appliance, a vending machine, medical equipment, a power unit, an air conditioning system, a measuring system for gas, water, electricity, etc., an automobile, an aircraft, etc.

Figure 16:
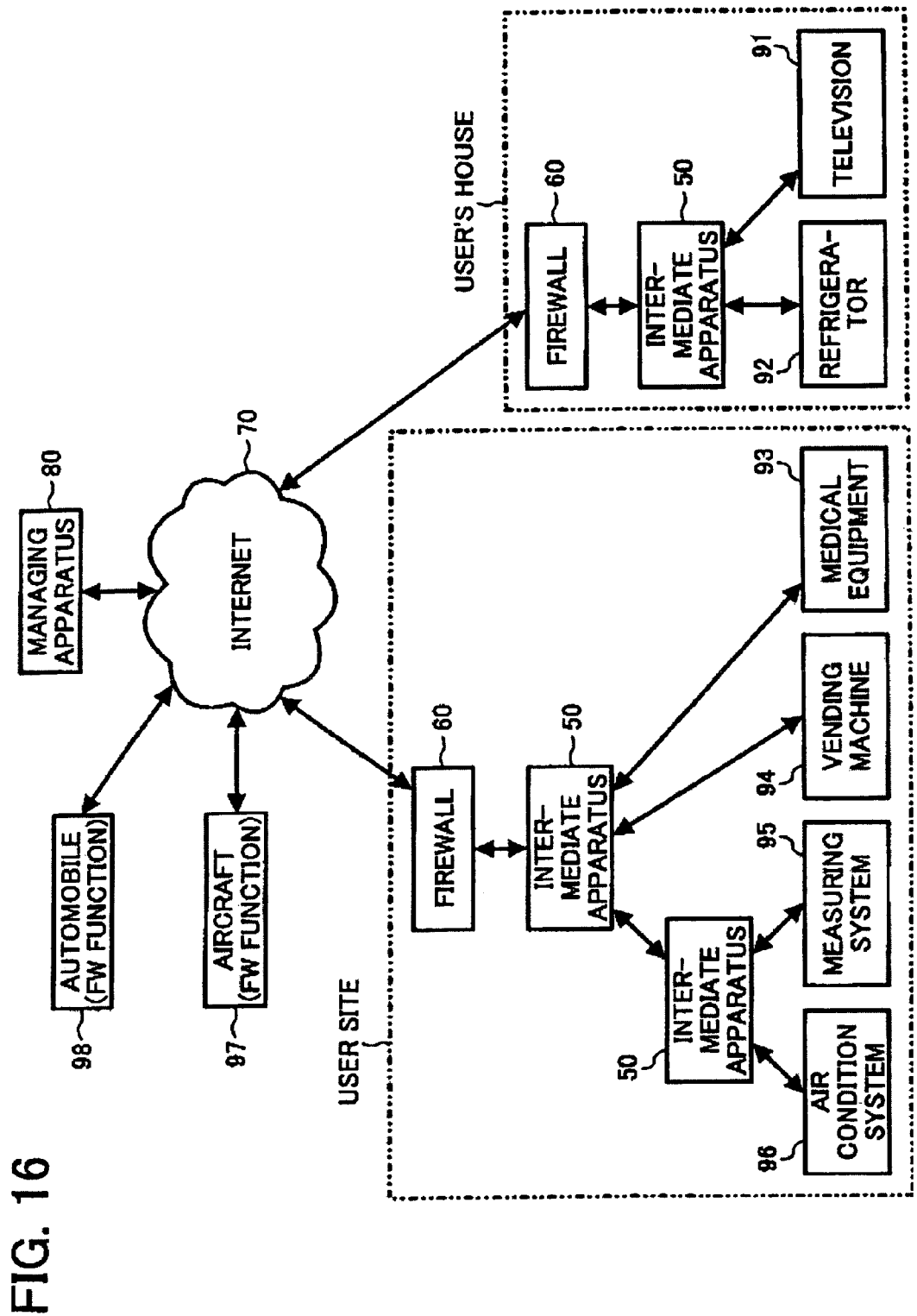
FIG. 16 is a diagram showing another example of a configuration of the present invention.

For example, by replacing these communication apparatuses in the remote management system in FIG. 15 by managed apparatuses, the remote management system in FIG. 16 can be configured. In this diagram, the communication apparatus as the managed apparatuses are, for example, network home appliances such as a television 91 or a refrigerator 92, medical equipment 93, a vending machine 94, a measuring system 95, an air conditioning system 96, an aircraft 97, an automobile 98. Additionally, it is preferable that the apparatuses that move in the wide area such as the aircraft 97 and the automobile 98 are provided with firewall 60 functions.

Of course, this invention can be applied to the communication system or the communication apparatuses above.

Additionally, the relationship or the purpose of the communication between the first communication apparatus 10 and the external devices as communication counterparts are not limited to remote management. For example, the apparatuses may be nodes of the distributed processing system for the purpose of load sharing. And the registrations of the communication apparatuses for the communication counterparts are not required.

Moreover, a program according to the present invention is a program for causing a computer to function as the first communication described above in the embodiments. The program is executed by the computer and the above-described effects can be obtained.

This program may be stored beforehand in a storing part such as a ROM, an HDD, etc. mounted to the computer. Alternatively, the program may be recorded in a non-volatile recording medium (memory) such as a CD-ROM, a flexible disk, an SRAM, an EEROM, a memory card, etc., to provide the program to the computer. By causing the computer to read out the program from the memory and execute the program, each of steps described above in the embodiments can be conducted.

Furthermore, by connecting to a network and downloading the program from an external device mounting the recording medium recording the program or an external device recording the program in a recording part, each of steps described above in the embodiments can be conducted.

The present invention is not limited to the specifically disclosed embodiments, and variations and modifications may be made without departing from the scope of the present invention.

The present application is based on the Japanese Priority Applications No. 2005-80209 filed on Mar. 18, 2005 and No. 2005-296527 filed on Nov. 10, 2005, the entire contents of which are hereby incorporated by reference.

The invention claimed is:

1. A communication apparatus configured to switch states when the communication apparatus is powered, the states including
   (1) a first state in which the communication apparatus is registered and replies to a request from an external device with a valid response,
   (2) a second state in which the communication apparatus is not registered, but is waiting for registration and replies with a valid response only when the request is a registration request and sends a failure response to the external device when the request is not the registration request, and
   (3) a third state in which the communication apparatus, being registered or not registered, receives the request, does not reply to the request with a valid response, but always sends a failure response to the external device,
the apparatus comprising:
   a transitioning part configured to transition the communication apparatus from said second state to said first state when the communication apparatus receives said registration request;
   a setting part configured to set a communication state setting indicating whether the communication apparatus is allowed to communicate with any external devices,
   wherein if the communication state setting indicates that communication by the communication apparatus is not allowed, the communication apparatus is in the third state and sends the failure response in reply to all received requests from all external devices; and
   a switching part configured
   (a) to switch states only between said second state and said third state, but not between said third state and said first state, while the communication apparatus is not registered, based on the communication state setting, and
   (b) to switch states only between said first state and said third state, but not between said third state and said second state, while the communication apparatus is registered, based on the communication state setting.

2. The communication apparatus of claim 1, wherein the setting part is configured to set said communication state setting according to a user operation.

3. A communication apparatus configured to switch states when the communication apparatus is powered, the states including
   (1) a first state in which the communication apparatus is registered and replies to a request from an external device with a valid response,
   (2) a second state in which the communication apparatus is not registered, but is waiting for registration and replies with a valid response only when the request is a registration request and sends a failure response to the external device when the request is not the registration request, and
   (3) a third state in which the communication apparatus, being registered or not registered, receives the request, does not reply to the request with a valid response, but always sends a failure response to the external device,
the apparatus comprising:
   a transitioning part configured to transition the communication apparatus from said first state to said second state when the communication apparatus receives a deregistration request;
   a setting part configured to set a communication state setting indicating whether the communication apparatus is allowed to communicate with any external devices,
   wherein if the communication state setting indicates that communication by the communication apparatus is not allowed, the communication apparatus is in the third state and sends the failure response in reply to all received requests from all external devices; and
   a switching part configured
   (a) to switch states only between said first state and said third state, but not between said third state and said second state, while the communication apparatus is registered, based on the communication state setting, and
   (b) to switch states only between said second state and said third state, but not between said third state and said first state, while the communication apparatus is not registered, based on the communication state setting.

4. The communication apparatus of claim 3, wherein the setting part is configured to set said communication state setting according to a user operation.

5. A method for controlling a communication apparatus configured to switch states when the communication apparatus is powered, the states including
   (1) a first state in which the communication apparatus is registered and replies to a request from an external device with a valid response,
   (2) a second state in which the communication apparatus is not registered, but is waiting for registration and replies with a valid response only when the request is a registration request and sends a failure response to the external device when the request is not the registration request, and
   (3) a third state in which the communication apparatus, being registered or not registered, receives the request, does not reply to the request with a valid response, but always sends a failure response to the external device,
said method comprising the steps of:
   transitioning the communication apparatus from said second state to said first state when the communication apparatus receives said registration request;
   setting a communication state setting indicating whether the communication apparatus is allowed to communicate with any external devices,
   wherein if the communication state setting indicates that communication by the communication apparatus is not allowed, the communication apparatus is in the third state and sends the failure response in reply to all received requests from all external devices; and
   switching states only between said second state and said third state, but not between said third state and said first state, while the communication apparatus is not registered, based on the communication state setting, and switching states only between said first state and said third state, but not between said third state and said second state, while the communication apparatus is registered, based on the communication state setting.

6. The method of claim 5, wherein the setting step comprises:
   setting said communication state setting in accordance with a user operation.

7. A method for controlling a communication apparatus configured to switch states when the communication apparatus is powered, the states including (1) a first state in which the communication apparatus is registered and replies to a request from an external device with a valid response, (2) a second state in which the communication apparatus is not registered, but is waiting for registration and replies with a valid response only when the request is a registration request and sends a failure response to the external device when the request is not the registration request, and (3) a third state in which the communication apparatus, being registered or not registered, receives the request, does not reply to the request with a valid response, but always sends a failure response to the external device, said method comprising the steps of:

transitioning the communication apparatus from said first state to said second state when the communication apparatus receives a deregistration request;

setting a communication state setting indicating whether the communication apparatus is allowed to communicate with any external devices, wherein if the communication state setting indicates that communication by the communication apparatus is not allowed, the communication apparatus is in the third state and sends the failure response in reply to all received requests from all external devices; and switching states only between said first state and said third state, but not between said third state and said second state, while the communication apparatus is registered, based on the communication state setting, and switching states only between said second state and said third state, but not between said third state and said first state, while the communication apparatus is not registered, based on the communication state setting.

8. The method of claim 7, wherein the setting step comprises:

setting said communication state setting in accordance with a user operation.

9. A communication system, comprising:

a second communication apparatus including a requesting part configured to send a registration request to a first communication apparatus; and the first communication apparatus configured to switch states when the first communication apparatus is powered, the states including (1) a first state in which the first communication apparatus is registered and replies to a request from said second communication apparatus with a valid response, (2) a second state in which the first communication apparatus is not registered, but is waiting for registration and replies with a valid response only when the request is a registration request and sends a failure response to the second communication apparatus when the request is not the registration request, and (3) a third state in which the first communication apparatus, being registered or not registered, receives the request, does not reply to the request with a valid response, but always sends a failure response to the second communication apparatus, the first communication apparatus including a transitioning part configured to transition the first communication apparatus from said second state to said first state when the first communication apparatus receives said registration request;

a setting part configured to set a communication state setting indicating whether the first communication apparatus is allowed to communicate with any external devices, wherein if the communication state setting indicates that communication by the first communication apparatus is not allowed, the first communication apparatus is in the third state and sends the failure response in reply to all received requests from all external devices; and a switching part configured (a) to switch states only between said second state and said third state, but not between said third state and said first state, while the first communication apparatus is not registered, based on the communication state setting, and (b) to switch states only between said first state and said third state, but not between said third state and said second state, while the first communication apparatus is registered, based on the communication state setting.

10. The communication system of claim 9, wherein the setting part is configured to set said communication state setting according to a user operation.

11. A communication system, comprising:

a second communication apparatus including a requesting part configured to send a deregistration request to a first communication apparatus; and the first communication apparatus configured to switch states when the first communication apparatus is powered, the states including (1) a first state in which the first communication apparatus is registered and replies to a request from said second communication apparatus with a valid response, (2) a second state in which the first communication apparatus is not registered, but is waiting for registration and replies with a valid response only when the request is a registration request and sends a failure response to the second communication apparatus when the request is not the registration request, and (3) a third state in which the first communication apparatus, being registered or not registered, receives the request, does not reply to the request with a valid response, but always sends a failure response to the second communication apparatus, the first communication apparatus including a transitioning part configured to transition the first communication apparatus from said first state to said second state when the first communication apparatus receives a deregistration request;

a setting part configured to set a communication state setting indicating whether the first communication apparatus is allowed to communicate with any external devices, wherein if the communication state setting indicates that communication by the first communication apparatus is not allowed, the first communication apparatus is in the third state and sends the failure response in reply to all received requests from all external devices; and a switching part configured (a) to switch states only between said first state and said third state, but not between said third state and said second state, while the first communication apparatus is registered, based on the communication state setting, and (b) to switch states only between said second state and said third state, but not between said third state and said first state, while the first communication apparatus is not registered, based on the communication state setting.

12. The communication system of claim 11, wherein the setting part is configured to set said communication state setting according to a user operation.

13. A non-transitory computer-readable medium storing a computer program, the computer program configured to cause a computer to function as a communication apparatus configured to switch states when the communication apparatus is powered, the states including
  (1) a first state in which the communication apparatus is registered and replies to a request from an external device with a valid response,
  (2) a second state in which the communication apparatus is not registered, but is waiting for registration and replies with a valid response only when the request is a registration request and sends a failure response to the external device when the request is not the registration request, and
  (3) a third state in which the communication apparatus, being registered or not registered, receives the request, does not reply to the request with a valid response, but always sends a failure response to the external device,
said computer program comprising:
a first code for transitioning the communication apparatus from said second state to said first state when the communication apparatus receives said registration request;
a second code for setting a communication state setting indicating whether the communication apparatus is allowed to communicate with any external devices,
wherein if the communication state setting indicates that communication by the communication apparatus is not allowed, the communication apparatus is in the third state and sends the failure response in reply to all received requests from all external devices; and
a third code for switching states only between said second state and said third state, and not between said third state and said first state, while the communication apparatus is not registered, based on the communication state setting, and switching states only between said first state and said third state, and not between said third state and said second state, while the communication apparatus is registered, based on the communication state setting.

14. The non-transitory computer readable medium of claim 13, wherein the third code comprises:
a fourth code for setting said communication state setting in accordance with a user operation.

15. A non-transitory computer-readable medium storing a computer program, the computer program configured to cause a computer to function as a communication apparatus configured to switch states when the communication apparatus is powered, the states including
  (1) a first state in which the communication apparatus is registered and replies to a request from an external device with a valid response,
  (2) a second state in which the communication apparatus is not registered, but is waiting for registration and replies with a valid response only when the request is a registration request and sends a failure response to the external device when the request is not the registration request, and
  (3) a third state in which the communication apparatus, being registered or not registered, receives the request, does not reply to the request with a valid response, but always sends a failure response to the external device,
said computer program comprising:
a first code for transitioning the communication apparatus from said first state to said second state when the communication apparatus receives a deregistration request;
a second code for setting a communication state setting indicating whether the communication apparatus is allowed to communicate with any external devices,
wherein if the communication state setting indicates that communication by the communication apparatus is not allowed, the communication apparatus is in the third state and sends the failure response in reply to all received requests from all external devices; and
a third code for switching states only between said first state and said third state, and not between said third state and said second state, while the communication apparatus is registered, based on the communication state setting, and switching only between said second state and said third state, and not between said third state and said first state while the communication apparatus is not registered, based on the communication state setting.

16. The non-transitory computer readable medium of claim 15, wherein the third code further comprises:
a fourth code for setting said communication state setting in accordance with a user operation.

* * * * *